(12) United States Patent
Adelman et al.

(10) Patent No.: US 9,269,037 B2
(45) Date of Patent: Feb. 23, 2016

(54) INTERACTIVE BASE AND TOKEN CAPABLE OF COMMUNICATING WITH COMPUTING DEVICE

(71) Applicant: Mighty Cast, Inc., Quebec (CA)

(72) Inventors: Adam Adelman, Quebec (CA); Ramon Alarcon, Los Gatos (CA)

(73) Assignee: MIGHTY CAST, INC., Westmount, Quebec (CA)

( * ) Notice: Subject to any disclaimer, the term of this patent is extended or adjusted under 35 U.S.C. 154(b) by 245 days.

(21) Appl. No.: 13/729,991

(22) Filed: Dec. 28, 2012

(65) Prior Publication Data

US 2013/0173658 A1   Jul. 4, 2013

Related U.S. Application Data

(60) Provisional application No. 61/581,486, filed on Dec. 29, 2011, provisional application No. 61/641,633, filed on May 2, 2012.

(51) Int. Cl.

| H04W 88/02 | (2009.01) |
|---|---|
| G06F 17/30 | (2006.01) |
| G06K 19/07 | (2006.01) |
| G06K 7/10 | (2006.01) |
| G06Q 50/00 | (2012.01) |
| G06K 19/077 | (2006.01) |
| G06Q 30/02 | (2012.01) |
| G06F 1/26 | (2006.01) |
| H04L 29/06 | (2006.01) |
| H04W 4/00 | (2009.01) |
| H04W 4/02 | (2009.01) |
| H04W 12/06 | (2009.01) |
| G06F 1/16 | (2006.01) |
| G06F 3/01 | (2006.01) |

(52) U.S. Cl.
CPC ............ *G06K 19/0723* (2013.01); *G06F 1/163* (2013.01); *G06F 1/26* (2013.01); *G06F 3/016* (2013.01); *G06F 17/30477* (2013.01); *G06K 7/10297* (2013.01); *G06K 19/07762* (2013.01); *G06Q 30/02* (2013.01); *G06Q 50/01* (2013.01); *H04L 63/0492* (2013.01); *H04W 4/008* (2013.01); *H04W 4/02* (2013.01); *H04W 12/06* (2013.01)

(58) Field of Classification Search
USPC ................... 700/236; 235/492.439; 707/769; 455/410, 411, 502, 522, 425, 500
See application file for complete search history.

(56) References Cited

U.S. PATENT DOCUMENTS

| 6,711,101 B2 | 3/2004 | Bornovski | |
|---|---|---|---|
| 8,336,784 B2 * | 12/2012 | Phillips | 235/492 |
| 8,452,259 B2 * | 5/2013 | Ellis et al. | 455/410 |
| 2009/0065587 A1 * | 3/2009 | Phillips | 235/492 |

(Continued)

OTHER PUBLICATIONS

Extended European Search Report for European Application No. 12862467.3.

*Primary Examiner* — Hung T Vy
(74) *Attorney, Agent, or Firm* — Notaro, Michalos & Zaccaria P.C.

(57) ABSTRACT

A smart charm bracelet that includes an elongated band or other base, at least one smart charm or other token that may be coupled to or otherwise associated with the elongated band or base, wherein the elongated band is able to communicate with the charm. The band and/or charm may also be able to communicate with a computing device, including but not limited to a mobile device. In addition, the band and/or charm may produce a light, sound, and/or vibration indication to a user upon the occurrence of an event.

18 Claims, 8 Drawing Sheets

(56) References Cited

U.S. PATENT DOCUMENTS

| | | |
|---|---|---|
| 2009/0094287 A1 | 4/2009 | Johnson et al. |
| 2010/0052916 A1 | 3/2010 | Canora et al. |
| 2010/0125362 A1* | 5/2010 | Canora et al. ............ 700/236 |
| 2010/0144429 A1 | 6/2010 | Ryan et al. |

* cited by examiner

INTERACTIVE BASE AND TOKEN CAPABLE OF COMMUNICATING WITH COMPUTING DEVICE

CROSS-REFERENCE TO RELATED APPLICATIONS

This application claims the benefit under 35 U.S.C. 119(e) of U.S. Provisional Application 61/581,486 filed Dec. 29, 2011 and of U.S. Provisional Application 61/641,633 filed May 2, 2012, which are incorporated herein by reference in their entireties.

FIELD OF THE DISCLOSURE

The present disclosure relates generally to interactive bases and tokens, and more particularly to interactive bases and tokens capable of communicating with computing devices.

BACKGROUND

Most jewelry is ornamental in nature serving as a form of personal adornment. Furthermore, jewelry typically lacks function and interaction beyond its aesthetic beauty.

U.S. Published Patent Application US2010/0144429 discloses unique individual encoded exchangeable functional jewelry charms for wearing and trading between individuals for use on a secure controlled internet communications system. The charms have unique identity codes for expanding a closed network communications of the individuals. U.S. '429 further discloses a bracelet having at least one detachable strand that accepts encoded charms. The charms may have at least one of a visible code on the surface of the charms and an internal transmitting device such as a radio-frequency identification (RFID) transmitter that is read by a corresponding proximity reader.

Techno Source™ and Disney® introduced Clickables™, a product launched at the 2008 Toy Fair. Clickables provides at least two eBracelets for user interaction. When a first eBracelet contacts a second eBracelet, and additionally at least one button from at least one eBracelet is pressed, electronic information will be shared between the eBracelets and at least one of the bands will glow to confirm that information has electronically passed between eBracelets. The eBracelets are subsequently contacted against jewelry boxes, the jewelry boxes are connected to computers via a Universal Serial Bus (USB) cable. The jewelry boxes send received electronic information to a server. The electronic information may unlock gifts, such as clothing and decor, for the user's Fairy.

SUMMARY OF THE DISCLOSURE

In one aspect, the present disclosure generally provides a smart charm bracelet that includes an elongated band or other base, at least one smart charm or other token that may be coupled to, engaged with, or otherwise associated with the elongated band or other base, wherein the elongated band is able to communicate with the charm. The band and/or charm may also be able to communicate with a computing device, for example but not limited to a mobile device. In addition, the band and/or the charm may produce a light, sound, and/or vibration or other tactile indication to the user on the occurrence of an event.

In accordance with another aspect of the present disclosure, the smart charm bracelet may be used in and/or for interactive online, mobile application game play, and/or social interaction.

In accordance with another aspect of the present disclosure, a charm or other token is provided that is able to both send information to and receive information from a bracelet or other base. In this sense, the charm or other token is capable of bidirectional data flow.

Accordingly, it is an objective of the instant invention to provide devices, systems and methods of interactive interchangeable jewelry or other tokens that signal a user of received information, possibly for the purpose of social interaction, online game play, and/or mobile game play.

A further objective of the instant invention is to provide devices, systems and methods of interactive interchangeable jewelry or other tokens for integrating virtual game play, online game play, and/or social interaction.

According to the present disclosure then, there is provided a method in a server, the method comprising: receiving registration information over a network from a computing device, the registration information including a token identifier identifying a smart token and a base identifier identifying a smart base, the token identifier being associated with the base identifier; querying a database for a user identifier that is associated with the base identifier included in the registration information; and storing the token identifier in association with the base identifier and the user identifier in the database.

According to the present disclosure then, there is provided a server comprising: a communications subsystem configured to: receive registration information from a computing device, the registration information including a token identifier identifying a smart token and a base identifier identifying a smart base, the token identifier being associated with the base identifier; and a processor configured to: query a database for a user identifier that is associated with the base identifier included in the registration information; and store the token identifier in association with the base identifier and the user identifier in the database.

According to the present disclosure then, there is provided a method in a smart base, the method comprising: receiving a token identifier from a smart token that has been mated with or otherwise associated with the smart base; sending registration information to a computing device, the registration information including the token identifier and a base identifier identifying the smart base.

According to the present disclosure then, there is provided a smart base comprising: a processor; memory capable of storing therein computer readable instructions; a communications subsystem configured to communicate with at least one smart token and a computing device, the processor being configured to execute the computer readable instructions to: receive a token identifier from a smart token that has been mated with or otherwise associated with the smart base; send registration information to a computing device, the registration information including the token identifier and a base identifier identifying the smart base.

According to the present disclosure then, there is provided a method in a smart token, the method comprising: communicating a token identifier identifying the smart token to a smart base; receiving information from the smart base; generating a notification in response to receiving the information from the smart base.

According to the present disclosure then, there is provided a smart token comprising: a memory capable of storing a token identifier identifying the smart token; an engagement mechanism for engaging a smart base; and a communication interface configured to communicate the token identifier to the smart base.

According to the present disclosure then, there is provided a method in a computing device, the method comprising:

receiving first information from a smart base, the first information including a base identifier identifying the smart base, and a token identifier identifying a smart token associated with the smart base; and sending second information to a server, the second information comprising the token identifier and the base identifier.

According to the present disclosure then, there is provided a system comprising: at least one smart base having a base identifier; at least one smart token having a token identifier, the smart token being engageable with and configured to communicate with the smart base; at least one server configured to maintain registrations of at least one of token identifiers and base identifiers with user identifiers; at least one computing device configured to communicate with the smart base and with the server; such that when a smart token is engaged with a smart base, the token identifier is communicated from the smart token to the smart base, then from the smart base to the computing device, and then from the computing device to the server, where the server stores the token identifier in association with the base identifier and the user identifier.

Other objects and advantages of this invention will become apparent from the following taken in conjunction with any accompanying drawings wherein are set forth, by way of illustration and example, certain embodiments of this invention. Any drawings contained herein constitute a part of this specification and include example embodiments of the present invention and illustrate various objects and features thereof.

BRIEF DESCRIPTION OF THE DRAWINGS

The present disclosure will be better understood having regard to the drawings in which.

DETAILED DESCRIPTION

Figure 1:
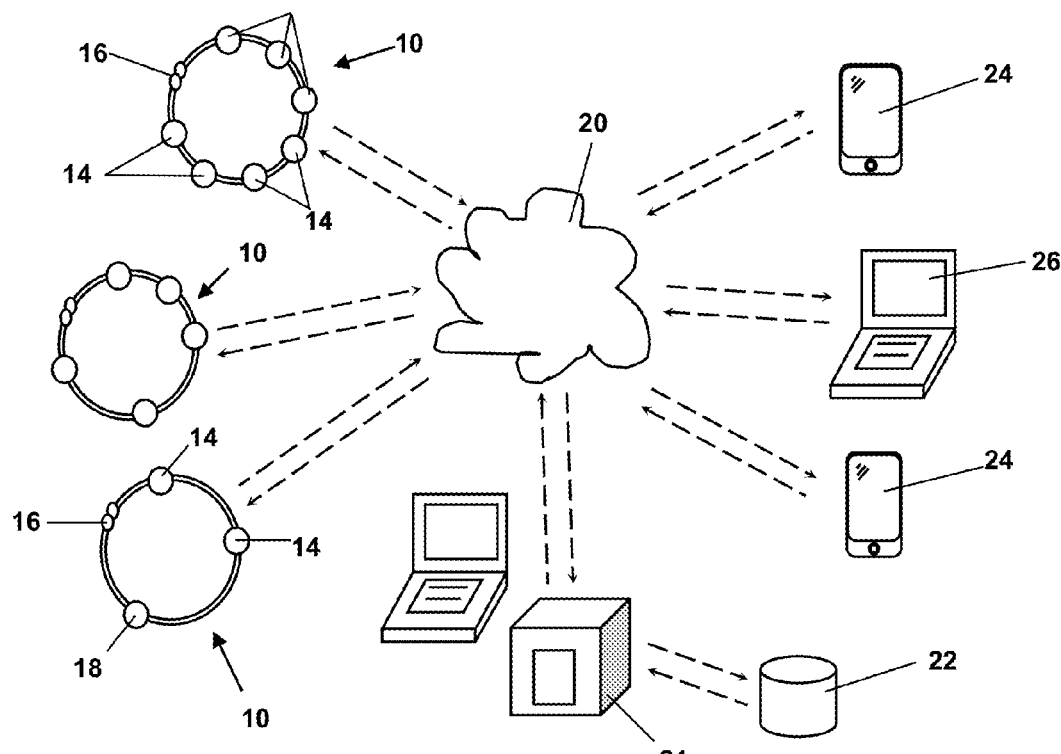
FIG. 1 is a schematic view of the wireless connection between the smart charm bracelets and a remotely located mobile device.

In at least one embodiment, the present disclosure provides a smart charm bracelet and at least one smart charm, the smart charm being associated with the bracelet and being able to communicate with the bracelet. In at least one embodiment, the charm can couple to or otherwise mate with the bracelet to provide a releasable connection thereto. The bracelet and/or at least one charm may be registered to a user ID. User IDs, bracelet IDs, and/or charm IDs may be stored in any suitable location, for example on a server or other computer. For example, when a user buys or otherwise acquires a bracelet, a unique ID of the bracelet may be registered to the user's unique ID on the server. Furthermore, when a user acquires a charm and associates the charm with his or her bracelet, for example by mating it with his or her bracelet, the charm ID can be registered or otherwise associated with one or both of the user's bracelet ID and the user's ID. In at least one embodiment, the charm ID can be communicated from the charm to the bracelet. The charm ID and bracelet ID can then be communicated to the server, and possibly associated with the user ID of the user stored on the server. The information communicated from the bracelet to the computing device, and/or the information communicated from the computing device to the server may include one or more indications. For example, the information may contain an indication that a charm has been added to the bracelet. On the other hand, the information may include an indication that a charm has been removed from the bracelet. These indications may be used in any suitable way, for example by the server or a computing device. For instance, the server may use these indications to register or de-register the charm ID to or from the particular bracelet ID and/or user ID. These registrations or associations may be used for any number of purposes, including to route information to and from charms and bracelets in an overall smart charm bracelet system. For example, when information is to be sent to a bracelet that is registered with a specific charm, the registration data on the server can be referenced to determine which bracelet is associated with the specific charm, and perhaps also which user ID is associated with the charm and/or bracelet. In one or more embodiments, charms may be transferred and/or exchanged between users. In such a case, registration data on the server may be modified accordingly to reflect the transfer and/or exchange. For example, a charm may be unregistered from a particular user ID and/or bracelet ID, and then registered to the user ID and/or bracelet ID of the new user. Furthermore, in one or more embodiments, a charm may be identifiable as a specific type of charm. For example, a charm may represent or signify membership in a particular group, for instance a secret society, a club, an association, etc. In addition, a charm may represent one or more characteristics of a game or a character in a game, for example a skill, power, health level, weapon, currency, status, ranking, etc. The foregoing description of various types of charms is provided as an example only and is not intended to be limiting.

A user is able to receive information wirelessly through his or her bracelet and charm from a computing device. A user may also be able to send information through his or her bracelet or charm to a computing device. The information being received at a bracelet can originate from any source, including the server, a computing device, and from a network such as the internet. Thus in at least one embodiment, the bracelet generally only communicates with a computing device. However, in other embodiments, the bracelet may communicate directly with other entities. In at least one configuration, the computing device may be a mobile device of a user. The bracelet will generally be able to communicate with the computing device when the two are within wireless range of one another. The computing device may in turn communicate with the server. For example, the computing device may send and/or receive information from the server. The computing device may also obtain registration information from the server, for instance information on registrations or associations between charm ID, bracelet IDs and user IDs.

As mentioned above, the computing device may be able to communicate with a server. The server may run one or more applications for any number of purposes, including creating and maintaining the registration or association of user IDs, bracelet IDs, and charm IDs. The server may also contain geographical tracking information for one or more bracelets. Tracking information may be used, for example, to determine when two or more bracelets come within a certain proximity of one another. The server may also host games, and/or store or process information relating to one or more games. The server may perform other tasks.

In addition, as described above, the bracelet or charm(s) may receive information from a computing device. The information may be a message, a notification, or any other type of information. The smart charm bracelet may then notify the user of the information in any suitable way, including but not limited to by producing sound, light and/or vibration. For example, the bracelet may signal the user of the occurrence of an event and/or communicate a message to the user. The event could be any event, for example, when a second bracelet comes into proximity to a first bracelet. This could occur, for example, when two or more users having bracelets walk by one another on the sidewalk, at a store, etc. Another type of event could be a notification that the user has received a message, for example an email or a text message. In some embodiments, the bracelet may not include a display screen, and thus the message itself may not be displayed on the bracelet or charm by the user. However, the token or bracelet will alert the user that a new message is awaiting the user, possibly on the user's mobile device, user's email account, etc. A further type of event may be an event relating to a game. A game may be hosted or played on a computing device, for example the user's computing device, on a network, for example the internet, an intranet, etc., or at any other suitable location. A game may involve any number and type of players, including those with and without bracelets and/or charms. Furthermore, a bracelet and/or charm may signal the occurrence of the event or communicate a message to the user in any suitable way, including but not limited to by producing sound, light and/or vibration. For example, bracelet or charm may play a specific sound, illuminate one or more lights, and/or vibrate to alert a user of a new message or of an occurrence of an event. The user may then be able to interpret the output of the bracelet or charm. For example, a certain vibration pattern could signify to a user that a new email has been received in the user's inbox. The user would then know to check his or her email for the new message. In at least one embodiment, a message may be outputted directly by the bracelet or charm. For example, a message could be outputted in Morse code or in any other suitable way using one or more of light, sound and vibration.

Although the present disclosure is described with reference to bracelets and charms, this is not intended to be limiting. Rather, the present disclosure is intended to apply to all other suitable types of bases and tokens. These include but are not limited to other body-wearable articles (e.g. necklaces, anklets, etc.), jewelry, board games (board is the base, playing pieces are the tokens) and toys.

In accordance with the present invention, shown in FIGS. 1-6B is a smart charm bracelet that includes an elongated band 12, at least one smart charm or token 14 coupled to, engaged with, or otherwise mating with the elongated band and the band having communication means, for example at least one communication chip, which may allow communication between the elongated band and at least one smart charm, and which may also allow communication between the elongated band and a computing device, possibly a mobile device.

Figure 4:
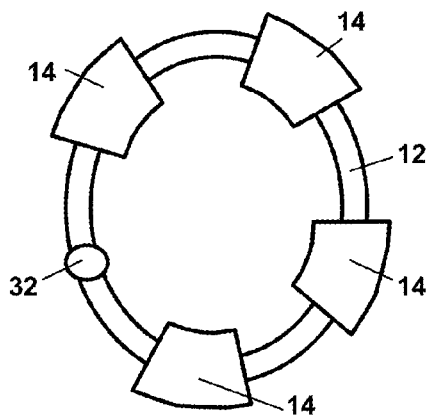
FIG. 4 is a front view of a smart charm bracelet.
Figure 5:
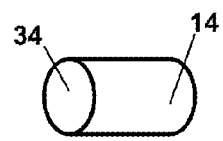
FIG. 5 is a perspective view of a smart charm having an eyelet.
Figure 6A:
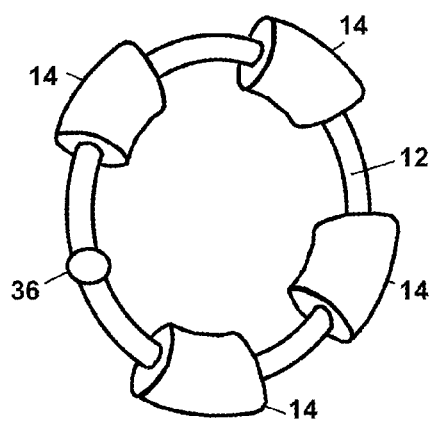
FIG. 6A is a perspective view of a smart charm bracelet having a body encasing the communications chip or system.
Figure 6B:
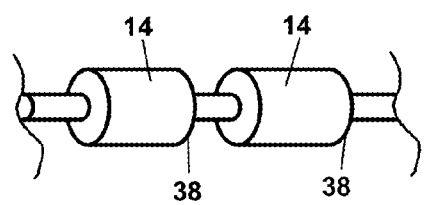
FIG. 6B is perspective view of a portion of a smart charm bracelet.
Figure 10:
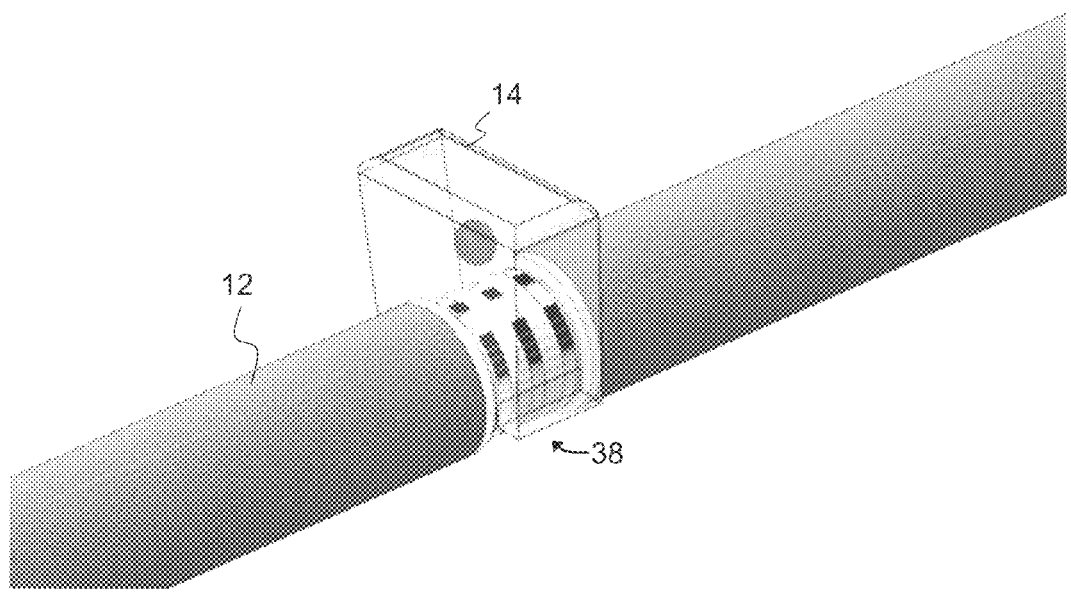
FIG. 10 is a perspective close-up view of an elongated band and a smart charm of one embodiment of the present disclosure.
Figure 11:
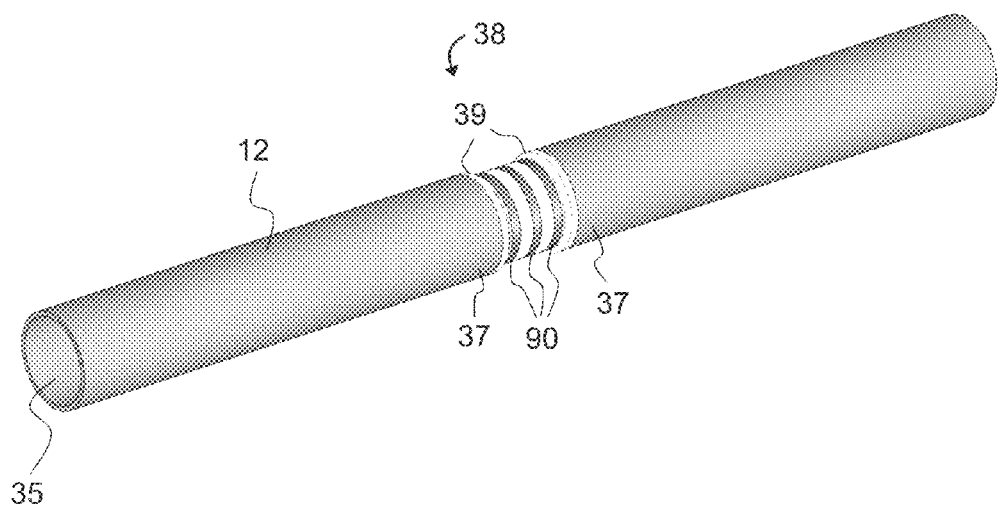
FIG. 11 is a perspective close-up view of an elongated band of the embodiment shown in FIG. 10.

As shown in FIGS. 1 to 6B, band 12 may be capable of receiving two or more charms 14. In at least one embodiment, band 12 may be capable of receiving charms 14 at a number of discrete locations on the band. For example, one or more electrical connectors of charm 14 may need to be placed in contact with one or more electrical contacts of band 12. A location on a band for receiving a charm will be sometimes referred to herein as a point of attachment. Various points of attachment 38 are indicated in FIGS. 6A and 6B. Close-up views of a point of attachment 38 are shown in FIGS. 10 and 11. When band 12 has more than one point of attachment 38, each of points 38 may be addressable so than band 12 can communicate with each charm individually. For example, in at least one embodiment, each point of attachment may be assigned a unique address, such as a port number (e.g. port 1, port 2, port 3, etc.). Thus when new a charm is received onto band 12, band may receive a unique identifier of the charm (e.g. charm ID) and then associate the charm ID with a particular address on the band (e.g. port number). Therefore when band 12 is to send information to a particular charm, for example information received from a computing device, the band may address the particular charm by way of the charm's specific port number in the band.

However, in one or more embodiments, band 12 may comprise one or both of a physical power and a communication bus or system bus. A system bus may include one or more of a data bus, an address bus, and a control bus. In such embodiments, charms may be connected to the bus(es) any suitable location, and thus band 12 may not require a plurality of discrete points of attachment 38. Furthermore, in embodiments where a charm does not require any electrical connections with the band, for example when a charm and band communicate wirelessly, a band need not necessarily comprise one or more discrete points of attachment 38.

Figure 3:
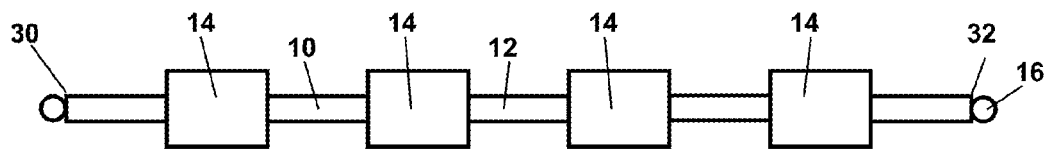
FIG. 3 is a front view of an unclasped smart charm bracelet.

Referring now to FIG. 3, the smart charm bracelet 10 includes an elongated band 12 having a length from a first end 30 to a second end 32. The elongated band 12 may secure together at first end 30 and at second end 32 by a closure latch or clasp 16 (FIG. 4). The elongated band 12 may receive at least one smart charm 14 (FIG. 3). Elongated band 12 may be of any suitable shape and form. For example, elongated band 12 may be a wire-like segment from tile first end 30 to the second end 32. In another embodiment, the elongated band 12 may be a strap-like segment having an overall width W1 (FIG. 6A).

Elongated band 12 may include one or more lights, possibly affixed thereto. Elongated band 12 may be one of a light wire or a light emitting diode (LED) light pipe or any other flexible bracelet-like structure capable of producing light.

Smart charm 14 may include at least one light source, including but not limited to one or more LED lights. Furthermore, in at least one embodiment, smart charm 14 may illuminate from a light source external to the smart charm 14, such as a light source from the elongated band 12.

As shown in FIG. 6A, band 12 may comprise a housing 36, and housing 36 may be coupled to the elongated band 12 and may hold a communication chip or other communication means for communicating with at least one smart charm 14 and/or with at least one computing device. In another embodiment, elongated band 12 may have an integrated communications chip that communicates with at least one smart charm 14 and/or with at least one computer 24, at least one computer illustrated as a smart phone, desktop computer, laptop computer, notebook, tablet device and other similar and known devices.

As shown in FIGS. 3 and 4, elongated band 12 may be flexible. The elongated band 12 may accept at least one smart charm 14 having an eyelet portion 34 to couple the elongated band 12 (FIGS. 4 and 5). In one or more embodiments, one or more charms 14 may be discrete, self-contained units. The smart charm 14 may be designed to provide additional value to the user through artistic or sentimental allure. The smart charm bracelet may include a closure latch, clasp or other fastening mechanism 16 for securing a bracelet to a user's wrist (FIG. 4).

In at least one embodiment, at least one smart charm 14 may be coupled to elongated band 12 by slidingly passing over first end 30 or second end 32 of elongated band 12 (FIG. 3). In at least one embodiment, at least one smart charm 14 may move freely about the length of elongated band 12.

In one or more other embodiments, smart charms 14 may be moveable along the elongated band 12 to a point of attachment 38, the point of attachment 38 may cause an interlocking or otherwise releasable connection in relation to elongated band 12 preventing the smart charm 14 from sliding in relation to elongated band 12 (FIGS. 6A and 6B).

In at least one embodiment, as shown in FIGS. 10 to 15, at least one smart charm 14 may snappingly couple directly to a point of attachment 38 on the elongated band 12. FIG. 11 shows a portion of one embodiment of elongated band 12 having a point of attachment 38, and defining a channel 35 therein to allow for the routing of wiring, the housing of circuit and/or other components, etc. The point of attachment may comprise means for preventing sliding movement of charm 14 along elongated band 12. In at least one embodiment, as shown in FIGS. 10 and 11, these means may be in the form of a pair of opposing shoulders 39. In use, charm 14 may be received onto band 12 between these two shoulders 39. In addition, as shown in FIGS. 10 and 11, part of point of attachment 38 may have a slightly smaller diameter or thickness than the adjacent portions 37 of elongated band 12. This smaller thickness may at least partially define shoulders 39.

Figure 12:
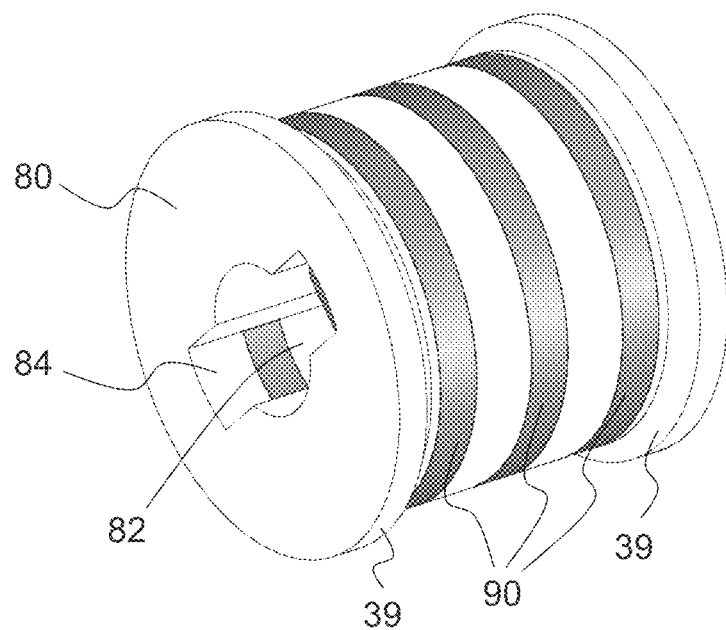
FIG. 12 is a perspective view of a carrier and electrical contacts of the embodiment shown in FIG. 10.

FIG. 12 provides a close-up view of point of attachment 38 of elongated band 12. The band may comprise at point of attachment 38 a carrier 80 for supporting one or more electrical contacts 90 for providing one or both of a power and a communication interface with one or more charms. Electrical contacts 90 provide for a wired (i.e. non-wireless) connection between a charm and an elongated band. Carrier 80 may define an opening therein or therethrough, for example to allow for the housing of and/or passage of electrical wiring or other components. Furthermore, carrier 80 may have means for preventing rotation of the carrier relative elongated band 12. In at least one embodiment, as shown in FIG. 12, these preventing means may be in the form of one or more keyed portions 84 in opening 82. However, other rotation preventing means are possible. In addition, carrier 80 will typically be made of non-electrical conducting material.

Figure 13:
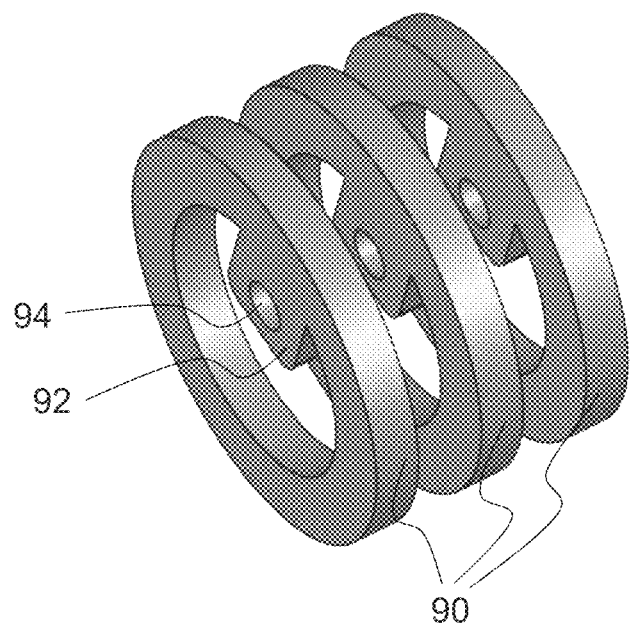
FIG. 13 is a perspective view of electrical contacts of the embodiment shown in FIG. 10.

The one or more electrical contacts 90 may be in any suitable form. As shown in FIG. 13, in one or more embodiments, the one or more electrical contacts 90 are substantially round or circular and have a ring-like shape. However, it will be appreciated that other shapes and forms are possible. Contact 90 can comprise a connection portion 92 for connecting to a wire or other conductor (not shown). Portion 92 may also define an opening therethrough, for example, to receive a wire. In addition, portion 92 may also be used to prevent rotation of contact 90 relative to carrier 80.

Figure 14:
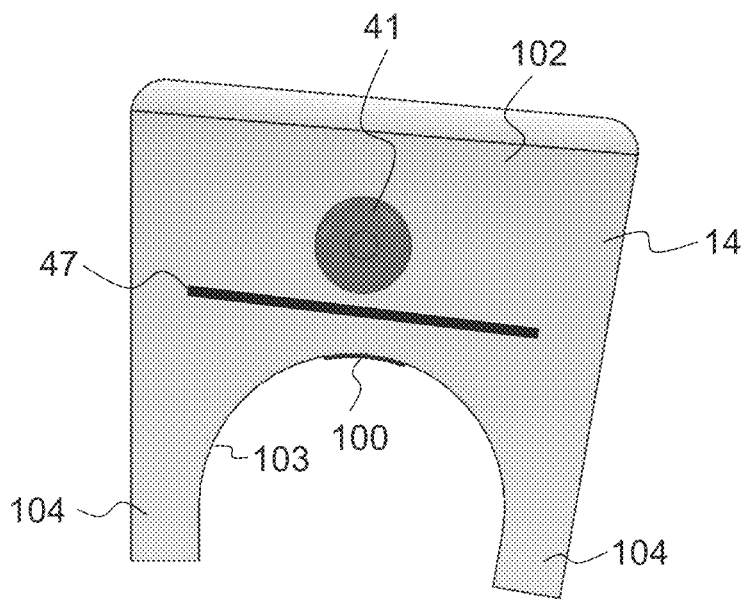
FIG. 14 is a side view of the smart charm shown in FIG. 10 showing a printed circuit board therein.
Figure 15:
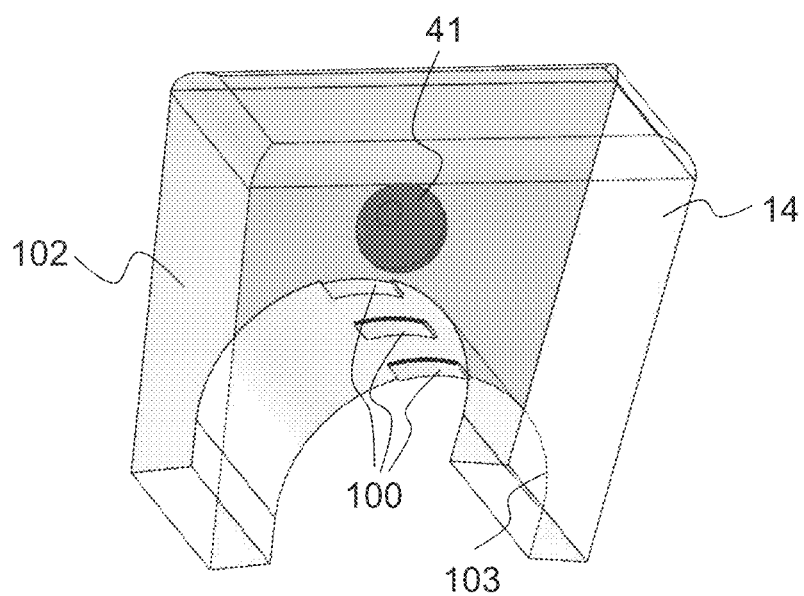
FIG. 15 is a perspective view of the smart charm shown in FIG. 14.

Charm 14 may have an engagement or coupling mechanism for engaging or coupling to a band. FIGS. 14 and 15 show a view of one embodiment of charm 14 that is adapted to mate with the elongated band shown in FIGS. 10 and 11. As shown in FIGS. 14 and 15, body 102 of charm 14 may have a pair of opposing extending portions 104 for engaging elongated band 12. Engaging surface 103 of the charm body 102 may define a curve or arc of slightly over 180 degrees to provide for a snapping action of charm 14 onto and off of substantially cylindrically-shaped point of attachment 38 of elongated band 12. The charm may also comprise one or more electrical contacts for contacting the electrical contacts on elongated band 12. As shown in FIGS. 14 and 15, one or more of these contacts may be in the form of a wiper contact 100. Furthermore, as described above, charm 14 may comprise one or more LEDs 41, a charm circuit (not shown) which may be partly or fully supported on a printed circuit board (PCB) 47. In at least one embodiment, the embodiment shown in FIGS. 10 to 15, charm 14 may be rotatable about band 12 at point of attachment 38. However, in one or more other embodiments, such rotation may be limited or prevented.

Furthermore, in specific aspects, the present invention provides or contemplates methods and devices other than those described herein for coupling, engaging or mating the at least one smart charm 14 with the elongated band 12. For example, in other embodiments in which the smart base is not in the form of a bracelet, a token may merely engage the base rather than being releasably coupling or mating with the base. For instance, in one or more embodiments, a token may merely rest on a base. Other engaging, coupling and mating means are also contemplated.

The smart charm bracelet 10 may include signaling means for communicating a message or indication to a user. For example, the indication could indicate the occurrence of an event. The signaling of the user may be accomplished through sound, light and/or vibration. It is contemplated that signaling output may come from various systems embedded within the elongated band 12 or at least one smart charm 14 or some combination thereof.

In at least one embodiment, a smart charm bracelet 10 may signal the user of a proximate relation to a second smart charm bracelet 10. Smart charm bracelet 10 may signal the user of the proximate relation by use of sound, light and/or vibration. In a specific aspect, smart charm bracelet 10 may include a unique signaling pattern for a proximate relation to one or more specific smart charm bracelets 10 and/or charms 14. For example, a particular nearness of a particular bracelet and/or charm, and/or a friend. For instance, a first bracelet may notify its user that it has come into proximity of a second bracelet that is registered to a friend, or a second bracelet that has a particular type of charm (e.g. a charm indicating membership in a particular group, e.g. a secret society). In at least one embodiment, the intensity of one or more lights of band 12 and/or charm 14 may increase as a first bracelet gets closer to a second bracelet. For another example, a unique signal pattern may alert the user that a proximate located individual possesses a particular smart charm 14, for instance one that could further advance the user in online game pay. A user may select or create unique signaling patterns for the happening of particular events. In addition, the smart charm bracelet 10 may include unique signaling patterns that are delivered to the smart charm bracelet 10 resulting from online or local application game play.

In at least one embodiment, obtaining a specific smart charm 14 or placing a plurality of smart charms 14 in a specific sequence or pattern about the elongated band 12 may affect game play, and/or produce smart charm bracelet 10 sound, light or vibration. Additionally, obtaining the specific smart charm or smart charm sequence or pattern may affect game play. Furthermore, the swapping of charms 14 amongst two or more users may also affect game play or cause some type of event. In at least one embodiment, the lineage of a particular charm between various bracelets and/or users can affect game play. Game play may also be affected when a user brings a bracelet comprising one or more specific types of charms, and/or a specific combination and/or pattern of charms, to a specific geographical location or area.

Referring to FIG. 1, one embodiment of a smart charm bracelet 10 is shown. The smart charm bracelet 10 includes at least one smart charm 14 (FIG. 3). Each of the at least one smart charms 14 may have a unique identifier, and the unique identifier may be read by or otherwise communicated to the elongated band 12. Charm 14 may also comprise other information, for example information that may be used in gameplay. In at least one embodiment, a charm may include an integrated ID tag to store and possibly transmit information, for example intelligent bar code information, to the elongated band 12. Elongated band 12 may then transmit the charm information and possibly a unique band ID and/or other information to a computing device 24, 26. Registration information including some or all of the charm and/or band information may then be communicated by the computing device 24, 26 to a server 21 or other computer, possibly through one or more networks 20. Server 21 may include but is not limited to one or more of an application server, a database server, a file server, web server, and a gaming server. Server 21 may maintain a registration or association (e.g. a mapping) of the unique charm ID with the unique band ID. The server may also maintain an association between band IDs and/or charm IDs, and user IDs. The registrations provide means to identify or determine which charms and bands are associated with a particular user, and/or which charms are associated with which bands.

Figure 2:
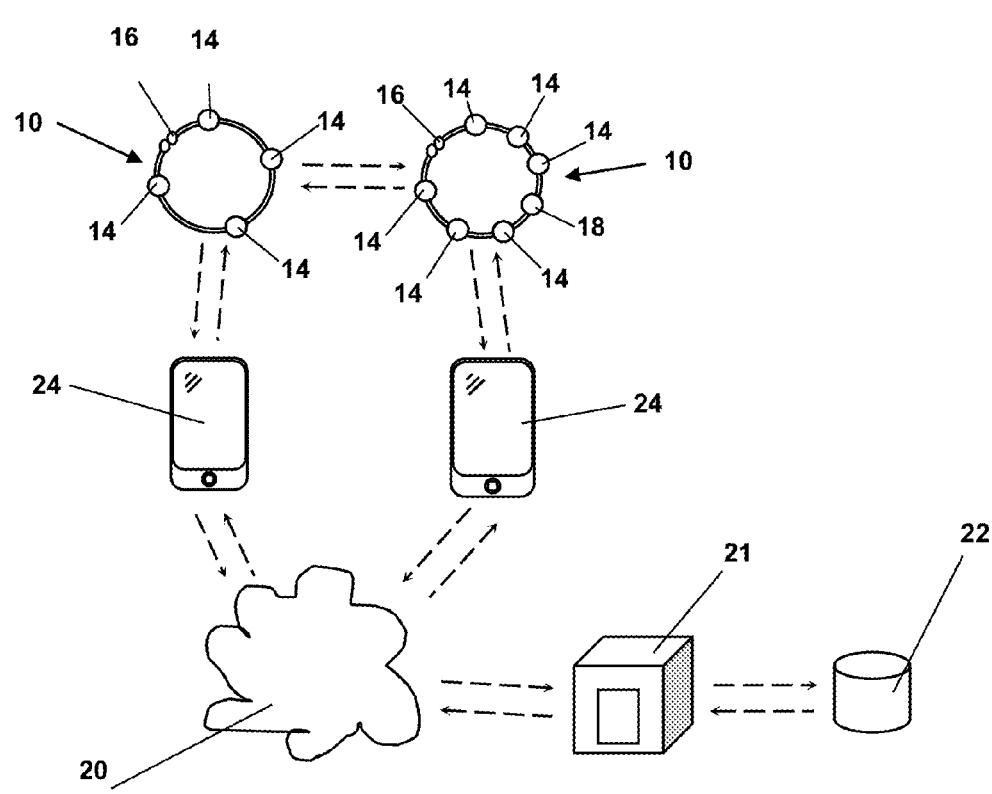
FIG. 2 is a schematic view of the direct wireless connection between at least one smart charm bracelet and at least one mobile device.

Each individual smart charm 14 may couple to or otherwise mate with elongated band 12. Charm 14 may store a charm ID (e.g. unique identifier, ID tag, etc.), and this charm ID may be communicated to band 12. For example, the charm ID may be communicated to the band when the charm is initially coupled to the band. The smart charm bracelet may provide the unique charm ID and the band ID, and/or other information to server 21 (FIGS. 1 and 2). As shown in FIGS. 1 and 2, server 21 may include a database 22. Server 21 may then register the received charm ID with one or both of the bracelet ID and a user ID. In at least one embodiment, charm 14 has a wired (i.e. non-wireless) data connection with band 12. Therefore information, including a charm ID, is communicated to and/or from band 12 over this wired connection. A charm may also have a wired power connection with band 12, for example to provide power from the band to the charm. Furthermore, in one or more other embodiments, charm 14 may have a wireless data connection with band 12 to provide for data transmission in one or both directions. For instance, smart charm 14 may include an embedded RFID tag for transmitting information. An RFID reader in the band 12 may transmit an encoded radio signal to a computer or other bracelets. The RFID tag will draw power from the encoded radio signal to power the microchip circuit of the RFID tag for sending identification information to the reader or other receiver. However, charm 14 may communicate with band 12 in one or more other ways, meaning in place of or in addition to an RFID tag or chip. The wireless connection between a charm and band may be of any suitable type, including but not limited to Bluetooth, etc.

In at least one embodiment, smart charm bracelet 10 will acknowledge receipt of the smart charm 14. The smart charm bracelet 10 may acknowledge the activation of the smart charm 14 about the elongated band 12 by producing sound, light or vibration from the elongated band 12 or at least one smart charm 14 or both. Additionally, activation of the smart charm 14 coupled to elongated band 12 may be acknowledged by an email, text message, video message, Short Message Service (SMS) message or other electronic communication methods. In addition, server 21 may acknowledge or confirm the registration of the new charm with the particular bracelet ID and/or user ID by sending a message back to the bracelet and/or charm through a computing device. For example, the server may send a message back to the bracelet and/or charm, via a computing device, causing the bracelet and/or charm to provide a notification to the user of the registration. The message may include an instruction instructing the bracelet and/or charm to generate a notification. The notification may in any form, including the bracelet and/or charm providing one or more of a light, sound and vibration or other tactile notification. For example, a light in a charm could blink three times to confirm to the user that it has been registered with the bracelet and/or user ID at the server. However, any other suitable type of notification may occur.

Furthermore, smart charm bracelet 10 may communicate and/or interact with one or more computing devices 24 and 26 (FIGS. 1 and 2). In general, the smart charm bracelet 10 may transmit and receive data from a computing device, such as for example a mobile device, a smartphone, or other device. In this sense, the charm is capable of bidirectional data flow. Communication between bracelet 10 and a computing device 24, 26 may be made over any suitable short or long range wired or wireless connection. For example, communications may be made over a wireless personal area network (WPAN), such as for example Bluetooth, or Zigbee™. Bluetooth operates an industrial, scientific and medical (ISM) band with a frequency between 2400-2480 MHz for low power consumption, open format and is universally adopted in smartphones and other computing devices. Zigbee operates at the Institute of Electrical and Electronics Engineers (IEEE) standard 802.15.4 for longer range than Bluetooth. Examples of other types of connections that may be used include universal serial bus (USB), Infrared Data Association (IrDA), Wi-Fi, RFID, and Near Field Communication (NFC) connections. However, other types of connections are possible.

The computing devices may push and pull information to the smart charm bracelet 10. Pulled information may be received at the computing devices in response to a particular request for information.

A typical example of pushing information includes a message sent by a friend or an online game. The computing device may receive information, for example over a network, that a message has been sent. Subsequently, the computing device may push information to the smart charm bracelet 10. Registration information (e.g. associations between two or more of user IDs, bracelet IDs and charm IDs) from the server may be used to route the message or information to the particular bracelet and/or charm. The information may indicate to the bracelet or charm to signal the user of the incoming message. The signal to the user from the smart charm bracelet 10 may be in the form of one or more of sound, light or vibration. In the case of the light, the light may flash at different pulse rates for signaling the user.

In an example embodiment of the smart charm bracelet 10, the elongated band 12 may include elements necessary to read and transmit the unique smart charm identifier. Additionally, the smart charm bracelet 10 may be capable of recognizing and communicating to the server 21 when a smart charm 14 is removed from the elongated band 12. The charm ID may be unregistered from the particular bracelet ID on the server. In this way, smart charm bracelets may acknowledge and provide information to the server 21 when smart charms 14 are transferred and/or swapped between at least two smart charm bracelets 10. For example, a charm ID may be unregistered from a first bracelet ID and then registered to a second bracelet ID. In practice, multiple users can seamlessly trade or collect charms. In at least one embodiment, the user need not take any steps to inform the server that smart charm 14 has been coupled to or otherwise mated with elongated band 12 because upon coupling, smart charm bracelet 10 may automatically send the unique ID assigned to the smart charm 14 to the server 21. Server 21 may then automatically receive registration information indicating at least the pairing between at least one smart charm 14 and elongated band 12, and then update the server registration information accordingly.

Computing device 24, 26 may execute one or more applications relating to bracelet and/or one or more charms. Such applications may include communication applications for communications between the computing device and a bracelet and/or charm, as well between the computing device and server 21. The computing device may also execute one or more applications relating to a game that involves or relates to a charm or bracelet, for example to show a status of a game, to show events in a game, and/or or to take turns or make moves in a game. The device may further include applications to allow a user to view and/or modify features, histories, and other information relating to a bracelet and/or the charms on the bracelet. For example, an application could cause the display of the device to show a list of current charms on a bracelet, the particular order or arrangement of the charms on the bracelet, a list of previous and/or swapped charms. An application may also allow a user to send and/or receive messages or other information to other bracelets, charms, and/or computing devices.

As shown in FIGS. 1 and 2, computing device 24, 26 may in turn communicate with a server 21 via a network 20. Server 21 may also be able to communicate with a database 22, which can be used for storing various types of information. In at least one embodiment, database 22 will be part of server 21. Network 20 may comprise one or more wired and/or wireless networks, including but not limited to a local area network (LAN) and/or wide area network (WAN), a wireless local area network (WLAN), for example Wi-Fi, a wireless metropolitan area network, for example WiMAX™, a telecommunications network, the internet, etc.

In at least one embodiment, computing device 24, 26 may need to reference the registration information stored on server 21 or database 22. This may be necessary to determine one or more associations between charm IDs, bracelet IDs and/or user IDs. For example, a computing device may need to look-up or query with which bracelet ID and/or user ID a particular charm ID is associated. In another example, a device may need to look-up what charm IDs are registered to a particular bracelet ID and/or user ID. In order to reference this registration information, a computing device may send a request or query to server 21 for the information. In one or more embodiments, a computing device may download part or all of the registration information from the server so that the information is stored locally in the device. This locally stored information may serve as a type of cache so that the device does not have to query the server 21 every time it needs to utilize registration information. This may be particularly useful if the device repeatedly needs to look-up the same IDs. In addition, the device and/or server may comprise mechanisms to ensure that the locally stored registration is accurate and up to date (e.g. not stale data). Furthermore, a device may also send new registration information to the server. This may be necessary when a charm is added to or removed from a bracelet. The device may relay this change information to the server and the server may update its registration information.

In addition to communicating with server 21, computing device 24, 26 may also communicate with other computers and entities, possibly via network 20. This is shown in FIGS. 1 and 2. In some cases, the communication may be routed through server 21. In other cases, the communication may not be routed through server 21. In at least one embodiment, server 21 may send messages, instructions, or other information to one or more of a charm, a band, and a computing device. In one or more embodiments, a message, instruction or other information may be sent by the server based on the geographical location of a bracelet, and/or the proximity of the bracelet to one or more other bracelets.

Smart charm bracelet 10 may be capable of generating one or more various signaling patterns. In practice, two friends or a larger group of friends can select a signaling pattern based on sound, light and vibration. Alternatively, the friends may create their own unique signaling pattern for the happening of a predetermined event. The signaling pattern may indicate information to the user of the smart charm bracelet 10. For example, a signaling pattern may indicate an online message that can be accessed by a user through a mobile application. Additionally, unique signaling patterns can be designated for different modes of communication, such as an email message accessed from a web page or an SMS message accessed by a mobile device.

In a particular embodiment of the present invention, information relating to smart charm bracelet 10 may be viewed from an application or a web page. In at least one embodiment, such information may be viewable on a computing device that is communication with (e.g. paired to) one or more bracelets. Smart charm bracelet 10 may play a role in game play for one or both of online and mobile games. A game player may receive an elevated status and increased abilities for game play by increasing the number of smart charms 14 associated with a smart charm bracelet 10.

The user may be able to review information relating to the smart charm bracelet 10 and included smart charms 14 through the online and mobile game play. Such information could include, but is not limited to, prior ownership information of a particular smart charm 14 or prior messages connected to a particular smart charm 14 by the past owners, as well as past achievements relating to a particular smart charm 14. This information may be stored in any suitable location, including in the charm, on server 21, on another server, on a computing device, etc.

In one or more embodiments, third parties may supply or distribute smart charms relating to specific events or games for promotion thereof. For example, a smart charm relating to a specific singer could be distributed to promote a concert tour. In this manner, information relating to concert dates and venues, etc. could be distributed to bracelet owners. In addition, the bracelet could trigger signaling patterns to others attending the same concert when the bracelets are in proximity to other smart charm owners who have purchased tickets to the same concert. Alternatively, smart charms could be distributed relating to specific board or video games that would allow similar promotion and recognition of enthusiast supporters and followers.

Referring now to FIG. 6A, a smart charm bracelet 10 having an elongated band 12 and a plurality of uniquely identifiable smart charms 14 is shown. In at least one embodiment, the relative order or orientation of at least two or more smart charms 14 about elongated band 12 may be regarded as or constitute user input. For example, the points of attachment on band 12 may be addressable, and each of these addresses may indicate or correspond to a relative position of the point of attachment to one or more other points of attachment on the band. In this way, when two or more smart tokens are mated with points of attachment of the smart base, the relative physical positions of each smart token on the smart base can be determined using the addresses. In addition, some or all of this user input may be communicated from band 12 to another entity, for example a computing device, server 21, etc, and may trigger an event. For example, such input may affect online game play and game play outcome. Additionally, the order may influence the outcome of a game play event. For example, adding smart charms, removing smart charms, rotating existing order of smart charts, or substituting existing smart charms with other smart charms may be regarded as user input, which may be used for any suitable purpose. As mentioned above, such input may influence or affect game play. In addition, the particular orientation or order of two or more charms on a band may determine or affect parameters of a game and/or a game character. For instance, the orientation of specific charms on a band may alter one or more characteristics of a character, such as attacking power, defending power, magical powers, health points, status, etc. In addition, the orientation may affect a move in a game, for example a type of attack, a type of defense, etc.

In one configuration, the smart charm bracelet 10 may be able to produce sound, light and vibrations during user game play in response to game activities and storylines. For example, bracelet 10 or charm 14 may produce one or more of sound, light and vibrations to indicate an occurrence of a game event or other event to a user. In addition, a message to a bracelet or charm may be communicated to a user by sound, light and/or vibrations. In at least one embodiment, a first user may send a message to the bracelet or a second user, for example in Morse code. The message may be outputted from the bracelet of the second user and/or charm 14 in Morse code in light, sound and/or vibrations. For example, one or more lights or LEDs in band 12 or charm 14 could flash in a particular way or pattern. In addition, a voice message may be played by the bracelet or charm. Other options are possible.

Hardware Implementation

Figure 7:
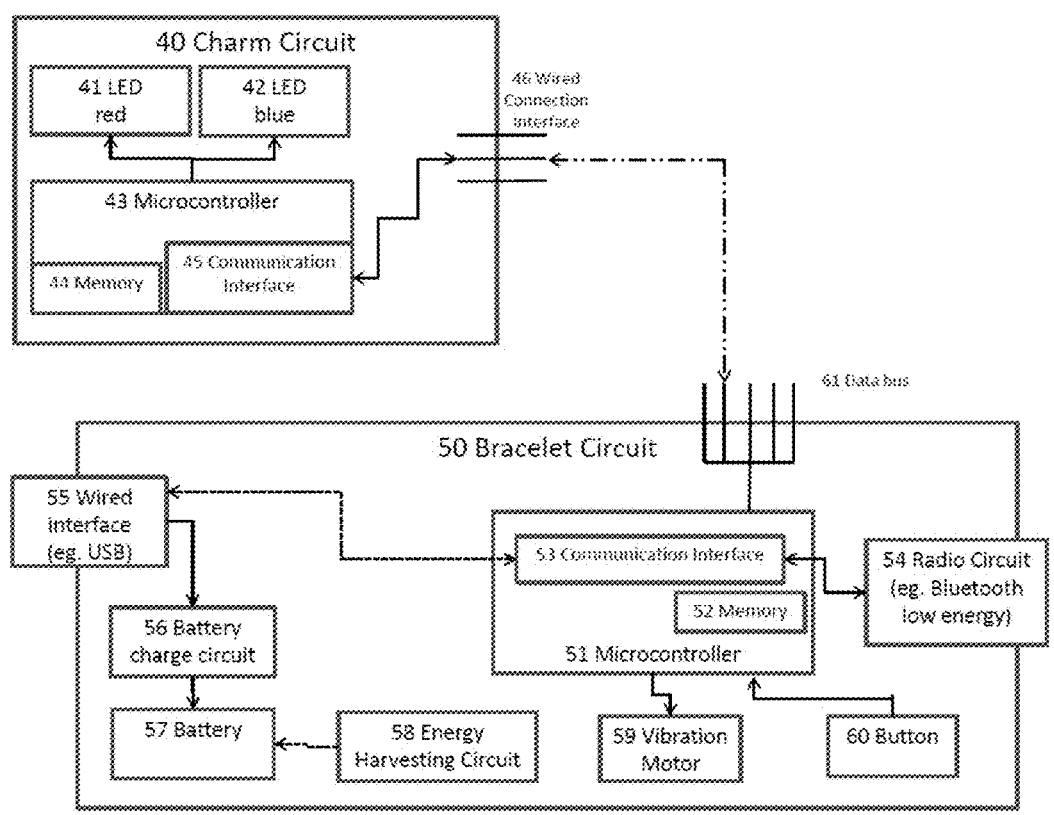
FIG. 7 is a block diagram illustrating the functional parts of the bracelet and one of the active charms to be used with the bracelet.

The smart charm 14 may contain a charm circuit 40 shown in FIG. 7. Charm circuit 40 may comprise a processor, such as for example a microcontroller 43. In addition, the charm circuit may comprise one or more LEDs or other light sources. For example, the charm may contain a red LED 41 and a blue LED 42. These LEDs may be discrete LEDs or may be combined into a single multi-color LED. The LEDs may be controlled by the microcontroller 43. One type of command received by the microcontroller 43 is a command to blink the LEDs in a particular manner, varying the intensity, color, speed or frequency in order to create a unique appearance. Incorporating a microcontroller 43 into the charm circuit 40 provides a level of intelligence to the smart charm 14. A benefit of this intelligence is that new patterns or behaviors can be implemented at the charm level without having to replace or update the bracelet 10. For example, this gives the manufacturer the ability to create new lines of smart charms 14 that may choose to interpret blink commands or blink command parameters in a different manner than the original smart charms 14.

In addition to blinking LEDs, the charm circuit 40 may also store the unique ID of the charm, or other another identification code or serial number code. This charm ID may be represented as a hexadecimal number. This charm ID may be stored in local memory 44 and may be programmed one time at the production factory. The memory 44 may be incorporated into the microcontroller 43 or it may be a separate component, possibly residing on a charm circuit board. The microcontroller and/or charm circuit 40 may also have a communication mechanism or interface 45, which may be of any suitable type. For example, the communication interface may be a common embedded system type of interface such as a universal asynchronous receiver/transmitter (UART) or a serial peripheral interface bus (SPI). The communication interface 45 may also be general purpose input/output (I/O) pins programmed to function as a communication interface. In addition, as described above, in one or more other embodiments, communication interface 45 may include or consist of an RFID tag or chip. The microcontroller 43 may both receive commands and transmit the identification code to the band 12 via the communication interface 45. In at least one embodiment, the communication interface connects to a wired connection interface 46. The wired connection interface 46 provides a physical connection to band 12 for the purpose of powering the charm circuit 40 and/or exchanging commands and/or data.

One possible embodiment of the wired connection interface 46 includes connections for power, ground, data transmit (TXD) and data receive (RXD). However, because the cost and complexity of a wired connection rises with the number of connections, it may be desirable to keep the number of connections to a minimum. In a at least one embodiment, the TXD and RXD functions may be carried out on a single line using a half-duplex arrangement. However, the half-duplex method is slower and can require more programming than the full-duplex arrangement.

Figure 9:
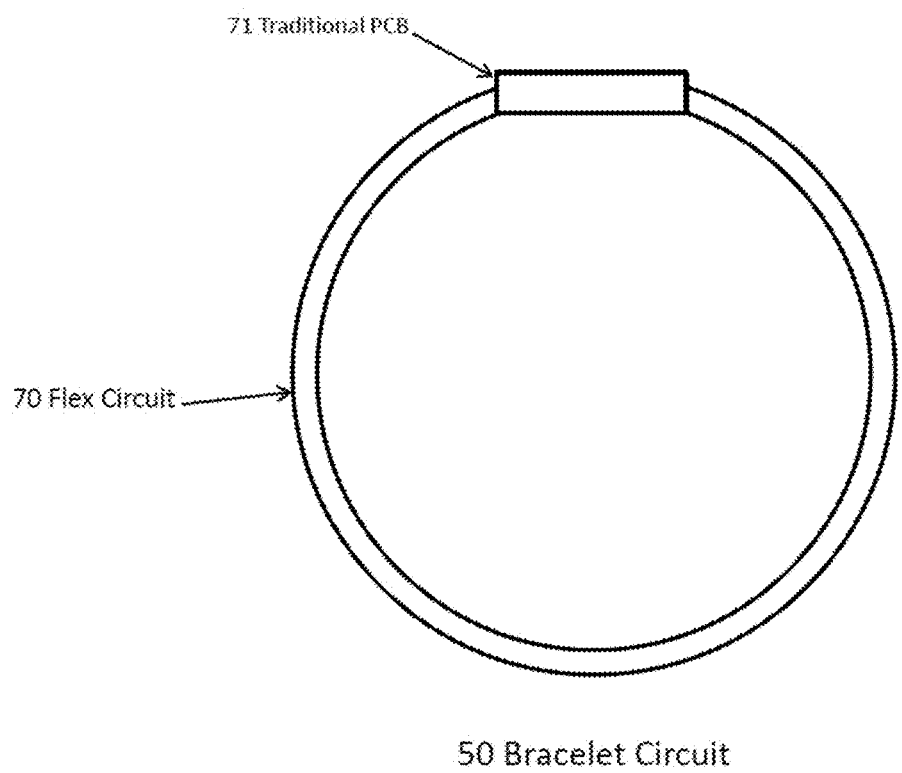
FIG. 9 is a schematic illustration of a bracelet of the invention.

As shown in FIG. 9, elongated band 12 may comprise a bracelet circuit 50. An embodiment of bracelet circuit 50 is shown in more detail in FIG. 7. Bracelet circuit 50 may serve as a power source for the one or more smart charms 14 and a communication intermediary between the smart charms 14 and a computing device 24, 26. Bracelet circuit 50 may comprise a communications subsystem, which may provide for one or both of wired and wireless communications to and/or from the bracelet. The communications subsystem may include but is not limited to communications interface 53, radio circuit 54, wired interface 55, and system bus or data bus 61. The bracelet circuit 50 may communicate with the charm circuit 40 in any suitable way, including by way of data bus 61. The data bus 61 may have multiple connection points in order to allow for the connection of a plurality of smart charms 14. In addition, the bracelet circuit 50 may include a microcontroller 51. The microcontroller 51 collects information, such as identification codes, from the one or more smart charm circuits 40. The microcontroller 51 may also be aware of the physical location of each charm on the data bus. For ease of discussion, the physical location on the data bus will be called the port number. These two types of information may be stored in memory 52. Memory 52 may be integrated into the microcontroller 51 or may be a separate component possibly residing on a bracelet circuit 50 board. In addition, bracelet circuit 50 may also comprise means for communicating over a wired and/or wireless connection(s) with one or more computing devices. In at least one embodiment, as shown in FIG. 7, these communicating means may comprise a radio circuit 54.

In at least one embodiment, at regular intervals, or upon request by a computing device 24, the information stored in memory 52 may be broadcast to one or more computing devices 24. This broadcast may be accomplished via a communication interface 53 and a radio circuit 54. Information that may be transmitted includes, but is not be limited to, identification codes, port numbers for installed charms 14, bracelet battery status, button state, and firmware revision number. In at least one embodiment, the radio circuit 54 is a Bluetooth Low Energy compliant radio capable of communicating with computing devices 24 that are compliant with the Bluetooth specification that also has proximity and locator capacity. However, as previously mentioned, radio circuit 54 may support and/or enable any other suitable type or types wireless communications.

The bracelet circuit 50 may include one or more outputs to facilitate managing device behavior and communicating information to the user. For example, the bracelet 10 may include a vibration motor 59 for the purpose of notifying the user of an event. Under certain circumstances, the computing device 24 may send a message to the bracelet circuit 50 to turn on the vibration motor 59 for a certain period of time or using a specific vibration pattern. The vibration motor 59 allows the user to be notified of an event without the need for the user to look at the bracelet or listen for an audible alert from the computing device 24.

The bracelet circuit 50 may also include one or more inputs to facilitate managing device behavior and communicating information to the user. For example, the bracelet 10 may have one or more buttons 60 that serves as an input. A software program may reside in the microcontroller 51 and may be programmed to interpret this button press in a number of possible ways. For example, the button press may be interpreted as a response to a message or the button press may serve as an ON/OFF toggle. In at least one embodiment, button 60 may be used to put the bracelet circuit 50 into a low power sleep mode. Another example use of the button 60 is as a method to toggle the radio function of the circuit in order to comply with environments where radio transmission is not allowed. The button 60 may be of any suitable type. In at least one embodiment, button 60 is a physical button. In another embodiment, button 60 may comprise a capacitive sensing region that is responsive to a finger tap. Other types of buttons are possible.

In order to function, the bracelet circuit 50 and the charm circuit 40 need power. A battery 57 may be provided to store the electrical charge current needed to operate the aforementioned circuitry. It may be possible to achieve a long product lifespan using a non-rechargeable battery, however, it would be beneficial to provide a means to recharge the battery 57. This may be accomplished by using a battery charge circuit 56. In at least one embodiment, the battery 57 is a lithium-polymer rechargeable battery and the battery charge circuit 56 is common recharging chip capable of regulating the voltage presented to the battery, monitoring the charge current, and preventing over-charge of the battery 57. The battery charge circuit 56 may be connected to a wired interface 55 that provides power. A common wired interface 55 is the USB interface. The USB interface may be used purely for purposes of recharging the battery 57. Because the USB interface is nearly ubiquitous in computing environments, finding a USB port or compatible cable for recharging is easy. An alternative embodiment is envisioned whereby the USB interface allows not only for the delivery of power, but also for the exchange of information. One benefit of this type of connection is that it allows the program that runs on the microcontroller 51 to be easily updated by users over a USB cable connected to a computer.

Because a wired interface 55 can be difficult to protect from moisture intrusion, in at least one embodiment the recharging of the battery 57 is accomplished via an energy harvesting circuit 58. In one possible embodiment, the energy harvesting circuit 58 utilizes an inductor to create small electrical currents that can slowly recharge the battery 57. The bracelet 10 containing the inductor would be placed onto an inductive charging station in order to provide the energy to drive the recharging process.

In one or more other embodiments, the energy harvesting circuit 58 may include circuitry design to capture environmental energy from one or more of the following sources; body heat, solar, or motion, including vibration. In the case of body heat, the circuit may contain a thermoelectric generator capable of deriving electrical power from the temperature gradient between the user and the environment. In the case of collecting solar energy, the energy harvesting circuit 58 could include a solar cell. In the case of motion, the circuit would include an electromagnetic generator where the magnet could move inside of a coil based on the arm movements of the user. In the case of vibratory energy, the circuit could contain a piezoelectric crystal connected to a mass. The movement of the mass would trigger the creation of a voltage in the crystal.

Because sufficient battery life may be an important factor in the success of products based on this technology, power management may be an important issue. For some applications, it is desirable that the bracelet circuit and charm circuits consume the minimum amount of energy required to accomplish their tasks. In order to facilitate this, the microcontroller 43 in the charm circuit 40 and the microcontroller 51 in the bracelet circuit 50 may be placed into a low power or "sleep" mode for a large percentage of time. By way of example, these microcontrollers may sleep for 95 milliseconds, then wakeup for 5 milliseconds in order to check to see if any services are required. If no services are required, then the microcontrollers will go back to sleep for another 95 milliseconds. This process will repeat and it is in this manner that the microcontrollers spend only 5% of the time in a high power state. In the event that a service is required, the microcontrollers will remain awake long enough to complete the service. Services may include, but are not limited to, the sending or receiving of data from a computing device 24, the microcontroller 51 commanding a charm to circuit 40 to turn on an LED 41, the charm circuit 40 reporting its identification code to the bracelet circuit 50, turning on or off the vibration motor 59, or reading the state of a button 60. In order to further minimize the power consumption of the system, the microcontroller 51 can store identification codes in memory 52 until the state of the smart charms 14 changes. If no smart charms 14 are added or removed from the system, then there is no need for the bracelet circuit 50 to query the charm circuit 40, thus allowing the charm circuit 40 to remain in a sleep state for a longer period of time.

As mentioned elsewhere in this document, one of the functions of the system may be to provide proximity information between two or more users. Also as mentioned previously, this proximity information can be determined via computing devices 24 providing global positioning system (GPS) information to server 21. In this example, in order to track the geographical location of a bracelet, the bracelet will be in proximity to and in communication with the computing device. The computing device may provide GPS location data to an application running on server 21. The application may keep track of this received GPS data (e.g. data points) and may run an algorithm that measures the distance between computing devices that are associated with bracelets. Thus by tracking the location of numerous computing devices that are each associated with a bracelet, the server can determine when a first computing device, and thus first bracelet, comes into proximity of a second computing device, and thus second bracelet. The value of this measurement can be used to trigger certain actions such a sending a notification. However, when users are in close proximity or are in areas of degraded GPS signal, it may be desirable to have an alternative means to determine proximity. The radio circuit 54 in the bracelet 10 can be leveraged to accomplish this task. In the example where the radio circuit 54 is a Bluetooth Low Energy radio, the normal mode of operation is for bracelet 10a shown in FIG. 8 to be in communication with computing device 24a and for bracelet 10b to be in communication with computing device 24b. When computing devices 24a and 24b come into close proximity, they would receive instructions from the server 21 to enter into a short range proximity detection mode. A goal of this mode is for computing device 24a to receive signals from bracelet 10b and for computing device 24b to receive signals from bracelet 10a. However, this presents a challenge, because, under the Bluetooth Low Energy protocol, a Bluetooth Low Energy device cannot be connected to more than one master at a time. In this example, the computing devices 24a and 24b act in the role of masters. Thus computing device 24a cannot communicate with bracelet 10b so long as bracelet 10b remains in communication with computing device 24b and conversely, computing device 24b cannot communicate with bracelet 10a so long as bracelet 10a remains in communication with computing device 24a.

Figure 8:
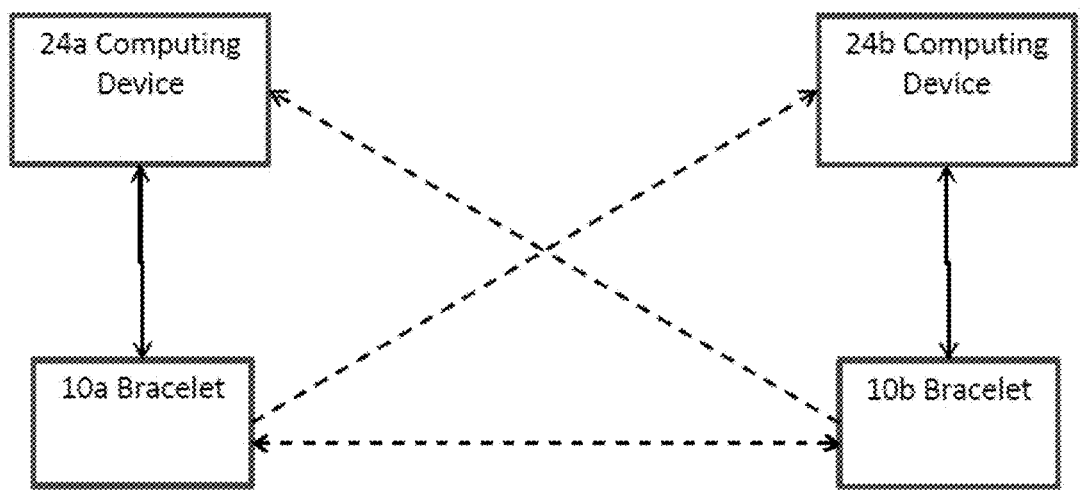
FIG. 8 is a block diagram of two bracelets and their associated computing devices for illustrating a proximity function of the invention.

A solution to this challenge is for each computing device 24 to tell its respective bracelet 10 to temporarily terminate communication with its master and enter into a "broadcast only" mode for a pre-determined period of time. Under the broadcast only mode, each bracelet 10 broadcasts information, but does not establish a connection with a master. In this example, as shown in FIG. 8, while bracelet 10a is in broadcast mode, computing device 24b can receive signals from bracelet 10a. Computing device 24b can then measure the strength of the received signals in order to determine its proximity to bracelet 10a. After a sufficient duration needed to broadcast a signal, the bracelet 10a would terminate broadcast only mode and re-establish communication with its master, computing device 24a. The same process would occur between computing device 24a and bracelet 10b.

This process of each computing device 24 instructing its bracelet 10 to enter into a broadcast only mode for a pre-determined period of time could repeat itself at regular intervals until it was determined that the computing devices 24a and 24b were no longer in close proximity, at which time, server 21 could instruct computing devices 24a and 24b to return to proximity determination based on GPS information alone.

In one or more other embodiments, bracelet 10 may comprise means for detecting one or more other bracelets in proximity. For example, making reference to FIG. 8, bracelet 10a may be able to directly detect the proximate presence of bracelet 10b. Similarly, bracelet 10b may be able to directly detect the proximate presence of bracelet 10a. Various means for detecting one or more other bracelets or bases are known to persons skilled in the art.

For example, in at least one embodiment, proximity detection may be done between two or more bracelets. In this mode, two or more bracelets may enter into a dynamic "BROADCAST" and "OBSERVER" mode, possibly at the instruction of their respective computing devices. Alternatively, a first bracelet may go into BROADCAST and OBSERVER mode. While in BROADCAST mode, the first bracelet may transmit its ID number, somewhat acting as a beacon. After doing this for some period of time, the first bracelet may then go into OBSERVER mode where it would listen for beacons from other bracelets. If it heard a beacon from another bracelet, it could use the received signal strength to infer proximity and could also store the ID of the received beacon in local memory. The first bracelet could alternatively switch between BROADCAST and OBSERVER modes for some defined period of time, after which, it could re-establish communication with its respective computing device and report any information it had discovered back to the computing device. A second bracelet, or even multiple other bracelets, could also perform a similar sequence, however, in order to ensure that all bracelets within local proximity were not trying to broadcast or observe at the same time, a timing method may be implemented. A timing method may be an instruction sent from the server that would tell which bracelet to go into BROADCAST mode first and which to go into OBSERVER mode first. This could be extensible to more than two bracelets and may be implemented using, for example, more complex timing instructions. Other timing methods exist such as the use of random intervals or intervals based on parameters that are unique to each bracelet. Use of such interval timing strategies could ensure that all bracelets in local proximity would have a chance to both listen for other beacons and broadcast their own beacon. However, the foregoing is only meant as an example is not intended to be limiting.

In one or more embodiments, the results of a proximity search or proximity detection at a bracelet and/or computing device may be communicated to server 21. The server may then store and/or utilize these results in some way.

Because the human wrist is round in nature, bracelets tend to be annular in form. A type of flexible electronic circuit substrate called a "flex circuit" lends itself well to annular forms. This provides for the ability to mount electronic components to a bendable substrate. An embodiment of the invention exists whereby the bracelet circuit 50 includes a flex circuit 70 as shown in FIG. 9. However because certain components may be too large to mount onto a flex circuit while still allowing the circuit to bend at the required radius, a portion of the bracelet circuit may also include a rigid substrate or traditional PCB (printed circuit board) 71 as also shown in FIG. 9.

Although the present invention is described in the context of a bracelet form factor, it is possible to fashion the invention into other form factors including, but not limited to, a necklace and an anklet. The invention can also be used for other than bracelets, necklaces and anklets being the support base of the smart charms. For example a model ship, e.g. a battleship or aircraft carrier may be the base that is also illustrated by FIG. 7, and the smart charms may be theme appropriate tokens that can look like model aircraft like jets, helicopters of other aircraft that are connected to ports of the base and that interact with the base, the computing device and the application like the smart charms 14 do in connection with the bracelet.

Server 21 may be any type of suitable computer or server. In at least one embodiment, the server will comprise a communications subsystem and a processor.

Examples of Use

The base (e.g. bracelet or model aircraft carrier or model building or other base) and tokens (e.g. charms or model aircraft or other charm) that can connect wired and/or wirelessly to a virtual game (i.e. through mobile devices/cloud and online games, etc.) in a two way fashion where unique information about the base/tokens may be sent to the device, which may be in communication with the server, and the device may also send unique information and instructions to the base/tokens. Some of the particular uses of the technology would be to:

1. Detect relative proximity between different token/base combinations.

2. Acknowledge different unique identifications (IDs) of the tokens and hence particular combinations. Tokens may have little or no technology. In one or more embodiments, a token may merely comprise a unique ID which the base reads and transmits/receives instructions.

3. Acknowledge exchanges of tokens (e.g. acknowledge and track a token once a base owner has given it to another base owner).

4. Token/Base can receive unique instructions from the device, which may be in communication with the server.

Some of the particular applications include:

1. New "User A" buys charm "1" and places on bracelet. User A also downloads an application. When charm 1 is clicked onto bracelet, app automatically acknowledges the type of charm, respective port (1-5), and gives secret information about that particular charm. Charm's unique ID is registered at or by server 21 as being purchased by "User A."

2. "User A" gives charm "1" to "User B". "User B" gives charm "2" to "User A". The trade is acknowledged. User A gets a message that they have given their charm to User B and a communication path is opened between the two (and vice versa). User A can track how far charm 1 spreads as User B trades charm, and so on.

3. User B can send User A a secret message through the app or web based game. For example, User B can send a message saying to meet them after school by sending a "dot dot dash" flash to User As Charm "2" (previously owned by User B).

4. Any user of the apps and bracelets/charms may be able to opt in to detect proximity to others. For wide distances, GPS may be used and a low level glow and/or vibration in the charms may occur to notify a user of the proximity of another user's bracelet. When users are indoors or within 10 meters, Bluetooth strength may be used as a proxy to detect proximity and a brighter glow or vibration will occur to signal closer proximity. Perhaps this is only one particular type of charm—a proximity charm).

5. Game play can send secret blink messages to particular charms depending on alerts from game progress or messages waiting for users.

6. User can change order of charms on bracelet (e.g. change order of charms A, B, C, D, E to C, D, A, E, B. Such a change may be acknowledged in the app and/or server 21 and may have implications to the game play (e.g. different combinations of charms have different magical meanings in the game).

7. Third Party Charms—Eventually, 3rd parties may have their own branded charms. For instance, if Company X has their own branded charm, it could send "secret" messages to flash on that particular charm and give secret messages to the mobile device. As another example, we are starting early conversations with some tween/teen pop stars that would like to have their own branded charms to push "secret songs", private concert info, or other messages to super fans. Third party charms could also leverage the GPS location of Users to push messages.

The above examples are not intended to be limiting.

In addition, the present disclosure contemplates devices, apparatuses, methods and systems consistent with the teachings of the above description and appended drawings.

While specific embodiments of the invention has been shown and described in detail to illustrate the application of the principles of the invention, it will be understood that the invention may be embodied otherwise without departing from such principles.

All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled In the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other use will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment.

Furthermore, additional features and advantages of the present disclosure will be appreciated by those skilled in the art.

In addition, the embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A method in a user portable smart base, the method comprising:
   receiving, at the user portable smart base, a token identifier from a smart token that is releasably engaged with the smart base;
   sending, from the smart base, to a computing device, the token identifier and a base identifier identifying the smart base;
   receiving an acknowledgement in response to first registration information having been stored at a server, the first registration information indicating that the smart token has been paired with the smart base; and
   triggering at one or more of the smart base and the smart token, in response to having received the acknowledgement, at least one of a visual, audible, and tactile notification.

2. The method of claim 1, wherein the acknowledgment is further in response to second registration information having been stored at the server, the second registration information indicating a pairing of the token identifier with a user identifier.

3. The method of claim 1, wherein the acknowledgement is received from the computing device.

4. The method of claim 1 further comprising determining a point of attachment of the smart token on the smart base, and storing the token identifier in association with the point of attachment in local storage of the smart base.

5. The method of claim 1, wherein the sending of the token identifier and a base identifier from the smart base to the computing device is in response to the token being engaged with the base.

6. A user portable smart base comprising:
   a processor;
   memory capable of storing therein computer readable instructions;
   a communications subsystem configured to communicate with at least one smart token and a computing device,
   the processor being configured to execute the computer readable instructions to:
   receive, at the user portable smart base, a token identifier from a smart token when the smart token is releasably engaged with the smart base;
   send, from the smart base, to a computing device, the token identifier and a base identifier identifying the smart base;
   receive an acknowledgement in response to first registration information having been stored at a server, the first registration information indicating that the smart token has been paired with the smart base; and
   trigger at one or more of the smart base and the smart token, in response to having received the acknowledgement, at least one of a visual, audible, and tactile notification.

7. The smart base of claim 6, further configured to receive the acknowledgement from the computing device.

8. The smart base of claim 6 wherein the communications subsystem comprises a wireless communication interface for communicating with the computing device.

9. The smart base of claim 6 further comprising at least one point of attachment for mating with a smart token.

10. The smart base of claim 9 wherein the at least one point of attachment comprises at least one electrical contact for electrically engaging at least one electrical contact of the smart token when the smart token has been engaged with the smart base, the electrical contact of the smart base serving as at least a system bus for interfacing with the smart token.

11. The smart base of claim 9 comprising a plurality of points of attachment for mating with a plurality of smart tokens.

12. The smart base of claim 11 wherein each of the plurality of points of attachment are addressable by the processor over the system bus.

13. The smart base of claim 12 wherein the address of each point of attachment corresponds to a position of the point of attachment on the smart base relative to one or more other points of attachment on the smart base, such that when two or more smart tokens are engaged with points of attachment of the smart base, the relative physical positions of each smart token on the smart base can be determined using the addresses.

14. The smart base of claim 13 wherein the relative physical positions of two or more smart tokens engaged with the smart base constitutes user input to the smart base, and wherein the processor is configured to send at least a portion of this user input to the computing device.

15. The smart base of claim 12 wherein when a smart token is engaged with a point of attachment, the token identifier is stored in the memory in association with the address of the point of attachment.

16. The smart base of claim 6 wherein the communications subsystem is configured to receive messages from the computing device, and the smart base is responsive to at least some of the received messages.

17. The smart base of claim 6, wherein the sending of the token identifier and a base identifier from the smart base to the computing device is in response to the token being engaged with the base.

18. The smart base of claim 6, wherein the acknowledgement is further in response to second registration information having been stored at the server, the second registration information indicating a pairing of the token identifier with a user identifier.

* * * * *